3,813,294
METHOD FOR INSULATING A PREFORMED
ELECTRICAL COIL
Clarence H. Dyer, Pendleton, Conrad L. Gaunt, Anderson, and Edward D. Jarvis, New Castle, Ind., assignors to General Motors Corporation, Detroit, Mich.
Filed Mar. 6, 1972, Ser. No. 231,836
Int. Cl. B44d 1/094, 1/14, 1/34
U.S. Cl. 117—218                                          1 Claim

ABSTRACT OF THE DISCLOSURE

A preformed electrical coil is heated and immersed in a bath of A stage epoxy resin. The coil is then immersed in a fluid bed of mica powder until the resin coating becomes impregnated with mica to the extent of approximately 45% mica. After the resin-mica coated coil is cured at a temperature determined by the curing temperature of the epoxy resin, it is immersed in a bath of A stage polyester resin. The polyester coated coil is again immersed in the fluid bed of mica powder to provide a mica coating thereon and is then dried at room temperature.

---

This invention is directed to a method for insulating a preformed electrical coil.

With many applications of electrical coils, for example the field coil windings of direct current dynamoelectric machines, the coil insulating material should have an adequate dielectric strength and sufficient cut-through resistance and be resistant to deterioration at high temperatures, inexpensive, easy to apply, soft and conformable during assembly, of a minimum uniform thickness and resistant to aging and vibration.

Presently, direct current dynamoelectric machine field coils are either hand taped and varnished or dipped in plastisol and baked. Hand taped coils, in view of the high labor content, are expensive and, being firm, are not readily conformable to the frame and pole shoe area in which they are assembled. Furthermore, the insulation thickness and uniformity varies; consequently, these coils are often insulated too thick for proper assembly or too thin allowing loosening and subsequent damage from vibration. The plastisol dipped and baked coils lack cut-through resistance, deteriorate at high temperatures and with age and also lack uniformity of thickness.

It is, therefore, an object of this invention to provide an improved method for insulating electrical coils which substantially eliminates the undesirable features of prior art methods.

In accordance with this invention an improved method for insulating electrical coils is provided wherein a heated preformed electrical coil is immersed in a bath of A stage epoxy resin, removed and immersed in a fluid bed of mica powder, removed and immersed in a bath of A stage polyester resin, removed and again immersed in the fluid bed of mica powder and permitted to dry at room temperature.

Figure 1:
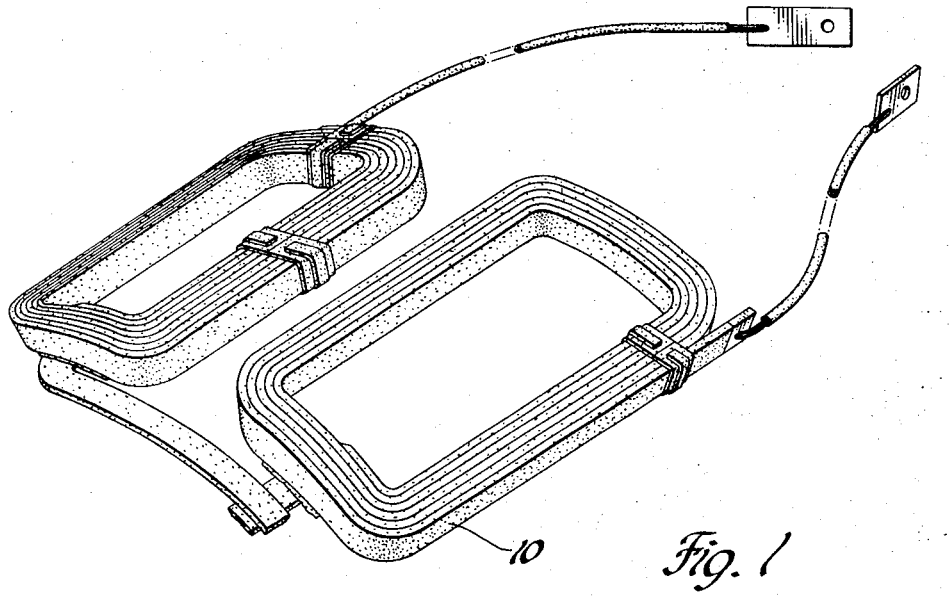
Figure 2:
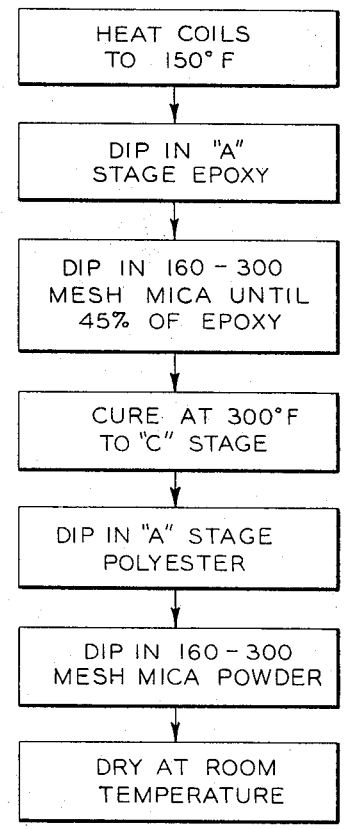

For a better understanding of the method of this invention, together with additional objects, advantages and features thereof, reference is made to the following description and accompanying drawing in which:

FIG. 1 is a perspective view of preformed coils which may be insulated by the method of this invention; and FIG. 2 is a flow chart of the method of this invention.

In the practice of this invention, the electrical coil is wound and formed as required by the application, as referenced by the numeral 10 of FIG. 1, and is heated to a predetermined elevated temperature, for example 150° F. The preformed and heated coil is then immersed in a bath of A stage epoxy resin until the coil is thoroughly resin coated between the windings. One example, and without intention or inference of the limitation thereto, of an epoxy resin suitable for purposes of the method of this invention is a Bisphenol-A and Epichlorohydrin, commercially available from the Celanese Coating Company or the P. D. George Company under the trade name of "Epirez 510." A suitable catalytic agent used with this epoxy resin may be a boron tri-fluoride monoethylamine, also commercially available from the Shell Chemical Company under the trade name "BF-3MEA." For best results, the viscosity of the epoxy resin of this bath should be within the range of 200 to 700 centipoises.

The thoroughly epoxy resin coated coils are then immersed in a fluid bed of mica powder. Mica powder of a range of 160 to 300 mesh or more has been found to be satisfactory for this application. It has been found that the mica powder, rather than merely forming a coating upon the epoxy resin coated coils, completely impregnates the epoxy resin coating to provide an epoxy-mica mixture. It has been found that the most desirable mixture is 45% by weight of mica to the epoxy. The use of mica flakes mixed with uncured epoxy resin for the purpose of providing insulation for a variety of applications is well known in the art. It has been found, however, that a pre-mixed mixture of mica flakes and uncured epoxy resin is unsatisfactory for the purpose of insulating preformed dynamoelectric machine field coils for the reason that the mixture is too tacky and viscous to effect the required uniform adhesion and uniform thickness.

The epoxy-mica coated coil is then cured to the C stage at an elevated temperature of a number of degrees as determined by the curing temperature of the epoxy resin employed, for example, 300° F. with the epoxy resin hereinabove set forth.

The cured coil is then immersed in a bath of A stage polyester resin of a viscosity within the range of 500 to 1000 centipoises, until thoroughly coated. One example, and without intention or inference of a limitation thereto, of a polyester resin suitable for purposes of the method of this invention is a resin designated XV–322A by its manufacturer, Schenectady Chemicals, Inc. A suitable catalytic agent is Cumene Peroxide, commercially available from Hercules Powder Co., Inc. After the polyester resin coated coil is removed from this bath, the residual heat of the coil is sufficient to cure the A stage polyester resin to the B stage in which it is sticky or tacky.

The B stage polyester resin coated coil is again immersed in the same fluid bed of mica powder until it is thoroughly coated with the mica which clings to the tacky surface of the B stage polyester resin, after which it is removed and permitted to dry at room temperature.

By drying the coil at room temperature, the polyester resin coating remains in the B stage in which it is soft and pliable to permit easier placement of the insulated coil onto the pole shoes and within the frame of the dynamoelectric machine.

The outer B stage polyester resin coating is then cured in place to the C stage by the heat supplied by the dynamoelectric machine during normal operation to firmly secure the insulated field coil to the inner wall of the dynamoelectric machine frame which is of a rough texture to which the polyester resin readily adheres.

While specific epoxy resins, polyester resins and catalytic agents have been set forth in this specification, it is to be specifically understood that alternate epoxy resins, polyester resins and suitable catalytic agents may be substituted therefor without departing from the spirit of the invention.

While a preferred embodiment of the present invention has been shown and described, it will be obvious to those skilled in the art that various modifications and substitu-

What is claimed is:

1. A method for insulating an electrical coil comprising the steps of: heating said coil to a predetermined elevated temperature, immersing said heated coil in a bath of A stage epoxy resin of a viscosity of 200 to 700 centipoises until said coil is thoroughly resin coated, immersing said resin coated coil in a fluid bed of mica powder of a range of 160 to 300 mesh while said epoxy resin coating is in the A stage, curing said epoxy-mica coated coil at an elevated temperature as determined by the curing temperature of the epoxy resin employed, immersing said cured coil in a bath of A stage polyester resin of a viscosity of 500 to 1000 centipoises until thoroughly coated, removing said coil from said bath of A stage polyester resin having a viscosity within the range of 500 to 1000 and permitting the residual heat of said coil to cure the polyester resin coating to the B stage, immersing said B stage polyester resin coated coil in a fluid bed of mica powder of a range of 160 to 300 mesh while said polyester resin is in the B stage, and drying said coil at room temperature.

References Cited

UNITED STATES PATENTS

| | | | |
|---|---|---|---|
| 2,997,776 | 8/1961 | Matter et al. | 117—Dig 5 |
| 3,140,195 | 7/1964 | Nagel | 117—75 |
| 2,785,383 | 3/1957 | Foster | 117—218 |
| 3,164,488 | 1/1965 | Workman | 117—75 |
| 2,459,018 | 1/1949 | DeMonte et al. | 117—218 |
| 2,970,936 | 2/1961 | Richardson | 117—218 |
| 3,071,496 | 1/1963 | Fromm et al. | 117—218 |
| 3,502,492 | 3/1970 | Spiller | 117—75 |

WILLIAM D. MARTIN, Primary Examiner

W. R. TRENOR, Assistant Examiner

U.S. Cl. X.R.

29—458, 605; 117—21, 29, 75, 132, 160 B, 232, Dig 5; 242—7.08